April 24, 1934.  W. H. KNIGHT, JR  1,956,035

STOP FOR GAS METER TANGENT ARMS

Filed Sept. 23, 1930

Inventor
William H. Knight Jr.
Kwis Hudson & Kent
attys

Patented Apr. 24, 1934

1,956,035

UNITED STATES PATENT OFFICE 1,956,035

STOP FOR GAS METER TANGENT ARMS

William H. Knight, Jr., Cleveland, Ohio, assignor to The Cleveland Gas Meter Company, Cleveland, Ohio, a corporation of Ohio Application September 23, 1930, Serial No. 483,933

1 Claim. (Cl. 73—1)

This invention relates to a gas meter in which the pressure of the gas operates to rotate the drive shaft of a dial registering or index mechanism, and more particularly to the novel construction of a stop device for the tangent arm forming one of the meter parts.

In gas meters of the usual and conventional type, the pressure of the gas flowing through the meter from the inlet to the outlet sides thereof acts, through the medium of alternately expanded and contracted diaphragms, to rotate the tangent arm of the meter, which arm in turn is operatively connected with the rotatable drive shaft of the dial registering or index mechanism of the meter.

It has been found necessary and essential to provide in gas meters some means to prevent the operation of the meter in the reverse direction, since otherwise dishonest consumers would reverse the inlet and outlet connections of the meter and run the meter in the opposite direction to thereby change the reading on the dial registering or index mechanism. Ordinarily the stop means employed has consisted of a counterweighted pivoted stop lever positioned so as to be tripped by the tangent arm when the latter is rotating in the normal direction and to form a positive stop for said arm when it commences to rotate in the opposite or reverse direction.

However it is sometimes desirable and necessary to permit a reverse operation of the meter within definite limits. This occasion arises when changes in temperature, protracted non-consummation of gas at the outlet side, or other conditions causes the pressure of gas on the outlet side of the meter to become higher than the pressure on the inlet side and to thereby tend to reverse the operation of the meter mechanism. It is essential when such a condition arises to allow a limited reverse operation of the meter to relieve the excess pressure on the outlet side thereof, since otherwise this tendency toward reverse operation would subject the meter mechanism to strains that might break certain of the operative parts; and particularly is this true, where the usual positive stop means is employed in the meter.

An object of the present invention is to provide a stop means for a gas meter that is so constructed as to allow a limited reverse operation of the meter before becoming effective to stop such reverse operation.

A further object is to provide a stop means of this character that is substantially silent in operation and in which the tripping actuation thereof is not accompanied with the familiar and usual click.

Additional objects and advantages will become apparent as the detailed description of the embodiment of the invention is proceeded with.

An embodiment of the invention is illustrated in the accompanying drawing wherein Figure 1 is a fragmentary plan view of a gas meter, the top wall of the casing being removed to show the operative parts of the meter.

Figure 5:
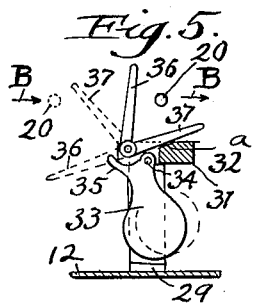
Figure 6:
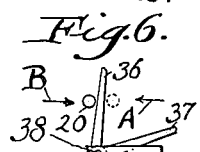
Figure 1:
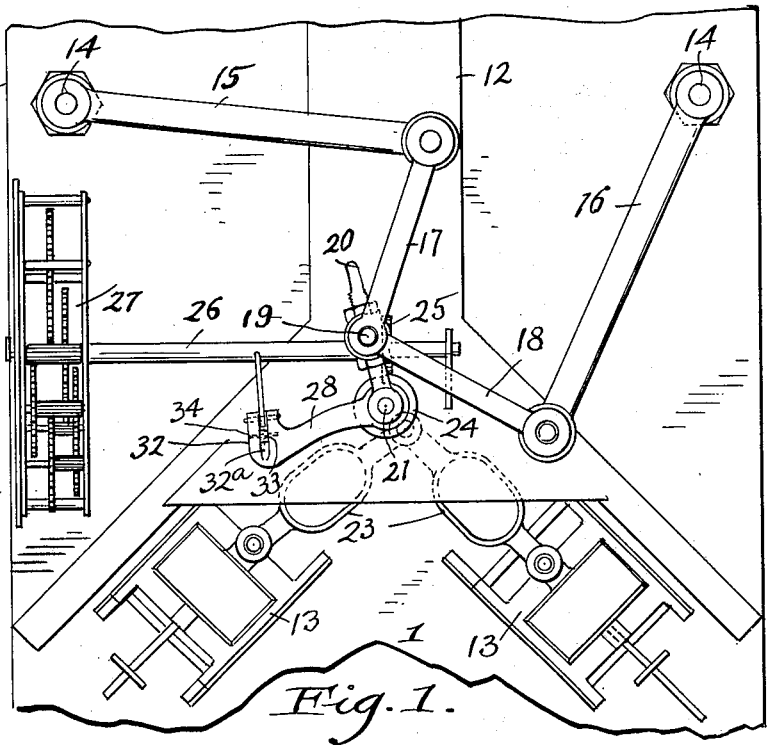
Figure 2:
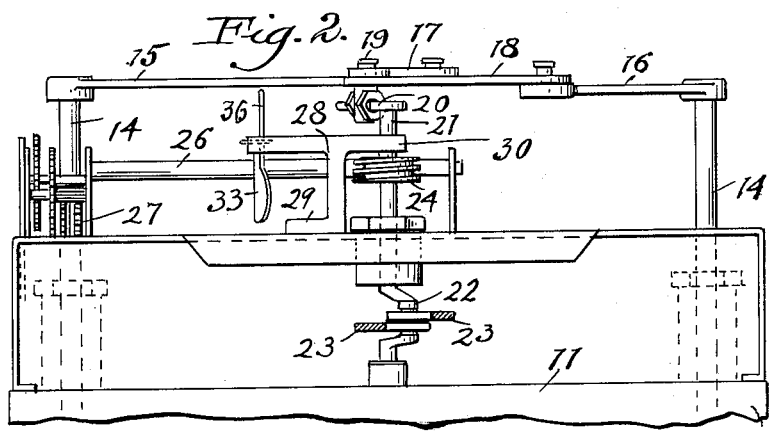
Fig. 2 is a fragmentary elevational view of the meter, looking at Fig. 1 from the bottom of the sheet of drawing, and showing certain of the operative parts in elevation and other of the parts in section, with the slide valve mechanism omitted.
Figure 3:
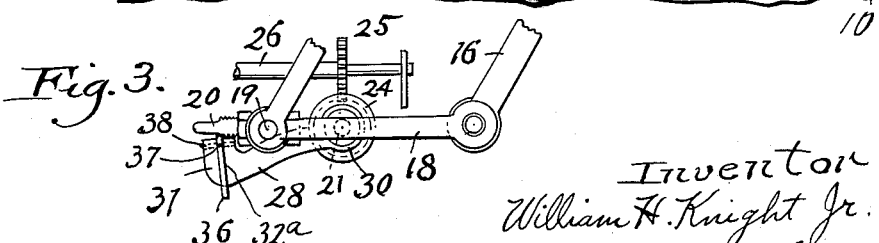
Fig. 3 is a detail top plan view showing the relationship between the tangent arm and the stop when the operation of the meter has been reversed and the movement of the tangent arm has been stopped.

Fig. 5 is a detail view of the stop; the dotted line position of the stop and the tangent arm indicating the relationship between these parts when the meter is operating in the reverse direction and just prior to the engagement of the stop by the tangent arm, while the full line position of the parts in this view illustrates the position assumed by the stop after the tangent arm has passed the same subsequent to its initial engagement therewith at the start of the reverse operation of the meter; and Fig. 6 is a detail view of the stop and illustrates the relationship between the stop and the tangent arm after the latter has moved the stop to the position shown in full lines in Fig. 5 and has made a complete revolution during reverse operation of the meter; the dotted line showing of the tangent arm indicating the manner in which it engages the stop when the meter recommences normal operation.

The meter construction shown herein, with the exception of the stop, is conventional and well understood in the art and need only be described briefly for that reason.

The meter casing is indicated generally at 10 and has arranged therein the usual horizontal partition or table 11 for the meter parts, the meter diaphragms being located within the casing 10 and below the partition or table 11, but not being shown in the drawing since their arrangement is well understood. The usual channel 12 is arranged on the partition or table 11 and is connected with the inlet side of the meter.

As is thoroughly understood the sliding valves 13 arranged on the table 11 are operated so that the diaphragms (not shown) will be alternately expanded and contracted by the pressure of the gas flowing through the meter, which expansion and contraction of the diaphragms will oscillate the vertically arranged shafts 14 operatively connected with the diaphragms and extending upwardly above the table or partition 11.

One end of the flag arms 15 and 16 are fixedly secured to the upper end of the shafts 14, while the opposite ends of the flag arms 15 and 16 are pivotally connected to the ends of flag arm links 17 and 18. The other end of the flag arm links 17 and 18 are pivotally connected with the tangent post 19 of the tangent, which post is carried by the tangent arm 20.

One end of the tangent arm 20 is secured to the upper end of a vertically disposed shaft 21 so as to rotate therewith. The shaft 21 extends through the channel 12 and is rotatably supported in bearings formed in the channel and in the partition or table 11 respectively, such shaft being provided intermediate the channel 12 and the table 11 with a crank portion 22 with which links 23 are connected, the opposite ends of these links being pivotally connected to the sliding valves 13. The shaft 21 is also provided above the upper side of the channel 12 with a worm 24 meshing with a pinion 25 fixed on a rotatable horizontally extending index shaft 26, which shaft 26 operates the dial registering or index mechanism 27.

The mechanism just described is well understood in the art and it will be sufficient to say for the purpose of this application that as the shafts 14 oscillate, the flag arms 15 and 16 are oscillated and this movement in turn is imparted through the flag arm links 17 and 18 to the tangent arm 20 in the form of a rotative movement of the latter. Rotation of the tangent arm 20 in turn rotates the shaft 21, the crank portion 22 thereof operating the slide valves 13, while the worm 24 carried by the shaft 21 rotates the index shaft 26 because of its intermeshing relationship with the pinion 25 carried by said index shaft. Of course the rotation of the index shaft 26 affects actuation of the dial registering or index mechanism 27 which actuation causes such mechanism to register the volume of gas passing through the meter and thereby enables the consumption of gas to be determined.

As previously pointed out it is desirable to provide a stop means effective to prevent unlimited reverse operation of the meter but designed so as to permit a limited reverse operation thereof. The stop means now about to be described is designed to accomplish this end.

A substantially T-shaped bracket 28 is secured upon the upper side of the channel 12 by means of a foot portion 29 arranged at the end of the leg of the bracket and soldered or otherwise secured to the channel. One arm of the T-shaped bracket 28 is provided with an enlarged eye 30 which is loosely arranged upon the shaft 21 between the upper end thereof and the worm 24 while the other arm of the bracket 28 is provided at its end with a projecting portion 31 extending therefrom in a direction substantially transverse to the arm of the bracket and toward the inlet side of the meter which side is adjacent the shafts 14. The portion 31 of the bracket is provided with a longitudinally extending slot 32 commencing at the end of the portion 31 and terminating a substantial distance inwardly thereof with an upwardly and rearwardly inclined end wall 32a.

A counterweight 33 is pivotally supported in the slot 32 intermediate the ends of the slot and upon a pivot pin 34 extending across the slot and carried by the portion 31 of the bracket. The counterweight 33 is provided adjacent its upper end with an outwardly and upwardly extending lug 35 arranged in vertical alignment with the slot 32.

A bell crank stop lever having arms 36 and 37 is pivotally mounted in the slot 32 adjacent the outer end thereof upon a pivot pin 38 extending transversely of the slot and through the stop lever at the junction of the arms 36 and 37.

Figure 4:
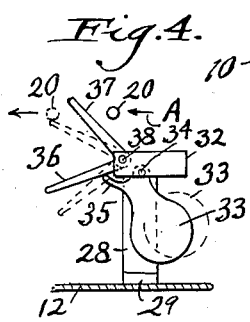
Fig. 4 is a detail view of the stop; the positions of the stop and the tangent arm during normal operation of the meter and just prior to the tripping engagement of the tangent arm with the stop being shown in full lines, while the relationship between the stop and the tangent arm, as the latter trips the former during normal operation is shown in dotted lines.

When the meter is operating normally the stop lever will be in the position shown in full lines in Fig. 4 with the arm 36 thereof engaging the lug 35 on the counterweight 33 and causing said counterweight to be moved slightly from its normal vertical position to the position shown in full lines in Fig. 4. The normal operation of the meter causes the tangent arm 20 to rotate in the direction of the arrow A in Fig. 4. As the tangent arm rotates, it approaches the stop lever until the tangent arm 20 (full lines Fig. 4) engages the upper side of the arm 37 of the stop lever, whereupon continued rotation of the tangent arm depresses or trips the arm 37 of the lever to the position shown in dotted lines in Fig. 4, such movement of the stop lever causing the counterweight 33 to swing back to the position shown in dotted lines in Fig. 4, because of the engagement of the arm 36 of the lever with the lug 35 of the counterweight. As soon as the tangent arm 20 has passed off the arm 37 of the lever, the counterweight returns to the full line position of Fig. 4 and in turn carries the stop lever to its normal position. It should be noted that neither the stop lever nor the counterweight during the normal operation of the meter engages with any fixed member and that therefore the tripping movement of the stop lever and counterweight is noiseless with the result that the usual click heard during the operation of a gas meter is eliminated.

In Fig. 5 is illustrated the relationship of the parts of the stop and tangent arm when the operation of the meter has been reversed. The tangent arm being in the position shown in dotted lines in Fig. 5 and the meter commencing to operate in the reverse direction, it will be seen that the tangent arm moves in the direction of the arrow B. This movement of the tangent arm causes it to engage the arm 37 of the stop lever on the under side thereof and as the reverse rotation of the tangent arm continues to move this arm of the lever toward the full line position of Fig. 5 until finally the arm 37 is positively arrested by the upwardly and rearwardly inclined wall 32a of the slot 32 with the arm 36 of the stop lever projecting upwardly as shown in full lines in Fig. 5. After the tangent arm 20 has swung the arm 37 of the stop lever over it will lie between the arms 37 and 36 of the lever, but will be free to continue its rotation in the reverse direction (see full line position of tangent arm 20 in Fig. 5).

The reverse operation of the meter continuing the tangent arm 20 will make a complete revolution in the reverse direction from the full line position of Fig. 5 to the full line position in which the tangent arm is shown in Fig. 6. The tangent arm reaching this latter position will engage the arm 36 of the stop lever and the reverse rotation of the tangent arm will thus be positively arrested since the arm 37 of the lever is abutting the inclined wall 32a of the slot 32 in the bracket 28. When this condition occurs the reverse operation of the meter will be stopped.

As soon as the normal operation of the meter recommences the tangent arm 20 will move away from the arm 36 of the stop lever since it will be rotating in the direction of the arrow A, and therefore, as soon as the tangent arm has made a complete revolution in the normal direction it will engage the arm 36 of the stop as indicated in dotted lines in Fig. 6, which engagement will swing the stop lever to its normal position (see full line position in Fig. 4).

It will be seen that a stop means constructed as described will permit a limited amount of reverse operation of the meter to the extent that the tangent arm is free to rotate in the reverse direction one complete revolution, in addition to its reverse movement in an amount equal to its distance from the stop lever when the reverse operation of the meter commenced. In other words it is assured that the meter will be allowed to operate in the reverse direction an amount sufficient to relieve the undesirable pressure on the outlet side of the meter.

It should further be noted that the meter having operated in the reverse direction until such operation is positively stopped (see Fig. 6), it is free to again start normal operation since the rotation of the tangent arm in the proper direction will affect a movement of the stop to its normal position.

Although a preferred embodiment of the invention has been illustrated and described herein, it should be understood that the invention is susceptible of various modifications and adaptations within the scope of the appended claim.

Having thus described my invention I claim:

In a meter of the type described, the combination of a frame, a tangent arm adapted to normally rotate in one direction, a bell crank lever pivotally supported by said frame, a counterbalance pivotally supported by said frame on an axis spaced from the axis of the said bell crank lever and adapted to yieldingly hold one arm of said lever in the path of said tangent arm, a stationary stop adapted to be engaged by said arm when the lever is rotated by reverse rotation of said tangent arm and hold the other arm in the path of said tangent arm upon continued reverse rotation thereof and arrest its movement.

WILLIAM H. KNIGHT, Jr.